US011091984B2

(12) United States Patent
Beuterbaugh et al.

(10) Patent No.: US 11,091,984 B2
(45) Date of Patent: *Aug. 17, 2021

(54) METHODS AND SYSTEMS FOR WELLBORE REMEDIATION

(71) Applicant: Halliburton Energy Services, Inc., Houston, TX (US)

(72) Inventors: Aaron Michael Beuterbaugh, Spring, TX (US); Enrique Antonio Reyes, Tomball, TX (US); Alyssa Lynn Lablanc, Humble, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/422,844

(22) Filed: May 24, 2019

(65) Prior Publication Data
US 2019/0277112 A1    Sep. 12, 2019

Related U.S. Application Data

(63) Continuation of application No. 15/542,069, filed as application No. PCT/US2015/015597 on Feb. 12, 2015, now Pat. No. 10,344,564.

(51) Int. Cl.
| | |
|---|---|
| *E21B 37/06* | (2006.01) |
| *C09K 8/528* | (2006.01) |
| *E21B 41/02* | (2006.01) |
| *C09K 8/54* | (2006.01) |
| *E21B 43/04* | (2006.01) |
| *E21B 43/267* | (2006.01) |

(52) U.S. Cl.
CPC .............. *E21B 37/06* (2013.01); *C09K 8/528* (2013.01); *E21B 41/02* (2013.01); *C09K 8/54* (2013.01); *E21B 43/04* (2013.01); *E21B 43/267* (2013.01)

(58) Field of Classification Search
None
See application file for complete search history.

(56) References Cited

U.S. PATENT DOCUMENTS

| | | | | |
|---|---|---|---|---|
| 4,030,548 A | * | 6/1977 | Richardson | ............... C02F 5/08 166/279 |
| 4,485,874 A | | 12/1984 | Meyers | |
| 4,747,975 A | | 5/1988 | Ritter | |
| 4,875,525 A | * | 10/1989 | Mana | ....................... C09K 8/80 166/280.2 |

(Continued)

FOREIGN PATENT DOCUMENTS

GB    2535080    1/2021

OTHER PUBLICATIONS

Mohammed et al.; The Chemistry of Chemical Scale Inhibitors and the Mechanism of Interactions with Carbonate Reservoir Rock; 2011; International Journal of Petroleum Science & Technology; pp. 33-45 (Year: 2011).*

(Continued)

*Primary Examiner* — Anuradha Ahuja
(74) *Attorney, Agent, or Firm* — Thomas Rooney; C. Tumey Law Group PLLC

(57) ABSTRACT

A method may include: introducing a treatment fluid comprising a descaling agent and a carrier fluid into a wellbore, the descaling agent comprising an N-(phosphonoalkyl)iminodiacetic acid wherein the treatment fluid has a pH less than 13.

20 Claims, 1 Drawing Sheet

(56) References Cited

U.S. PATENT DOCUMENTS

| | | | | |
|---|---|---|---|---|
| 5,019,343 | A * | 5/1991 | Hwa | C02F 5/14 252/387 |
| 2004/0254079 | A1 * | 12/2004 | Frenier | C09K 8/52 507/260 |
| 2007/0158067 | A1 * | 7/2007 | Xiao | C09K 8/52 166/279 |
| 2007/0187090 | A1 * | 8/2007 | Nguyen | E21B 37/06 166/249 |
| 2008/0035340 | A1 * | 2/2008 | Welton | C09K 8/035 166/279 |
| 2009/0038799 | A1 | 2/2009 | Garcia-Lopez de Victoria et al. | |
| 2011/0105368 | A1 | 5/2011 | Welton | |
| 2012/0097392 | A1 | 4/2012 | Reyes et al. | |
| 2012/0186811 | A1 * | 7/2012 | Welton | C09K 8/528 166/279 |
| 2013/0213657 | A1 * | 8/2013 | Dobson, Jr. | C09K 8/24 166/308.5 |
| 2014/0151042 | A1 * | 6/2014 | Faugerstrom | C09K 8/506 166/278 |
| 2014/0296113 | A1 | 10/2014 | Reyes et al. | |
| 2017/0066957 | A1 * | 3/2017 | LaBlanc | C09K 8/035 |
| 2017/0088769 | A1 | 3/2017 | Kesavan et al. | |
| 2017/0198195 | A1 * | 7/2017 | Beuterbaugh | C09K 8/528 |

OTHER PUBLICATIONS

"How is chelation of calcium and magnesium affected by pH?" dated Jul. 25, 2017, The Dow Chemical Company "Dow" retrieved from dowac.custhelp.com/app/answers/detail/a_id/5578/related/1.

Non-Final Office Action for U.S. Appl. No. 15/542,069 dated Aug. 27, 2018.

Notice of Allowance for U.S. Appl. No. 15/542,069 dated Feb. 26, 2019.

Great Britain Search Report and Written Opinion for Application No. GB 1710905.9, dated May 14, 2021.

* cited by examiner

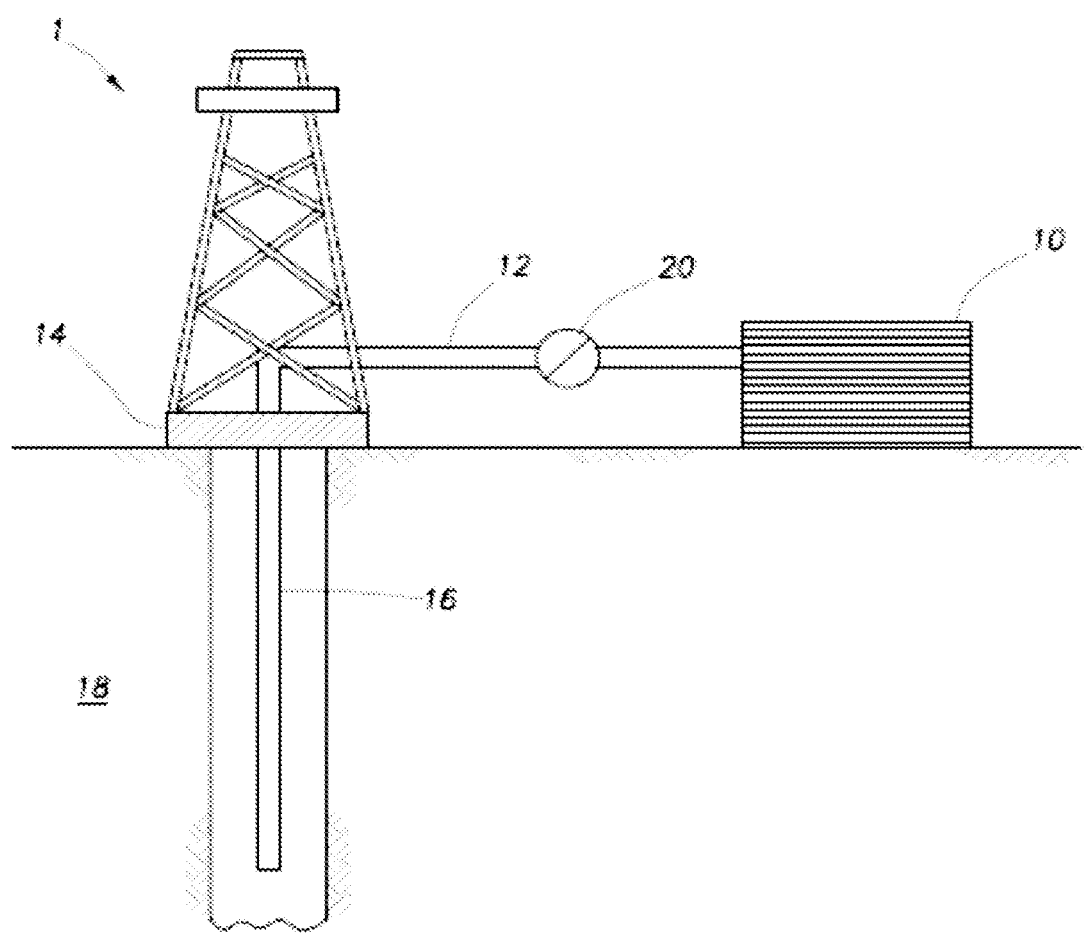

METHODS AND SYSTEMS FOR WELLBORE REMEDIATION

BACKGROUND

The present disclosure generally relates to wellbore cleanout and other remediation operations, and, more specifically, to methods for removing inorganic scale in the presence of a consolidated particulate pack.

Treatment fluids can be used in a variety of subterranean treatment operations. Such treatment operations can include, without limitation, drilling operations, stimulation operations, production operations, cleanout and other remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Inorganic scale deposition frequently occurs during the lifetime of a wellbore. Scale deposition can be undesirable due to its propensity to decrease production by lowering a subterranean formation's permeability and restricting other flow pathways within the wellbore, including within particulate-packed fractures. In addition to decreased production, fines leached from inorganic scale can be exceedingly damaging to wellbore equipment, such as through abrasion and seal degradation.

Although scale dissolution and removal operations may be performed periodically during the lifetime of a wellbore, the most desirable techniques for addressing scale seek to prevent or limit its deposition in the first place. For this purpose, a number of scale control additives have been developed and are commonly used in the art.

Scale deposition in a wellbore often occurs due to initial dissolution of a material (e.g., a subterranean formation matrix), followed by re-precipitation of a dense scale deposit upon exceeding the solubility limit of the dissolved material under the chemical and physical conditions present within the wellbore. The deposited scale can be the same material as that initially dissolved or a different material generated from a further chemical reaction or morphological change. Deposited scale can often be highly dense and have a crust-like shell, thereby providing a low contact surface area for promoting redissolution during a cleanout operation.

Inorganic scale deposits may be formed from precipitated metal salts, such as metal carbonates or metal sulfates. Additional inorganic materials may also be present in combination with precipitated metal salts. For example, in siliceous subterranean formations (e.g., sandstone or shale formations), siliceous materials such as silicates or aluminosilicates may be present in combination with inorganic salts within an inorganic scale. Siliceous scale deposits often require treatment with a hydrofluoric acid source to achieve dissolution of their siliceous material. Metal salts, in contrast, can often be dissolved with common organic acids and/or mineral acids other than hydrofluoric acid (e.g., hydrochloric acid). In a somewhat different approach, chelating agents or other ligands may promote dissolution of metal salts within an inorganic scale deposit through metal ion complexation. Many chelating agents contain multiple carboxylic acid groups, which in many cases are believed to be the active metal-complexing species. As used herein, the terms "complex," "complexing," "complexation" and other grammatical variants thereof will refer to the formation of a metal-ligand bond, such as through formation of a chelate.

Inorganic scale deposition can be especially problematic in the presence of a particulate pack, such as a proppant pack or a gravel pack. Particulate packs provide a large surface area upon which initial scale nucleation can commence and subsequent deposition can take place. Since the average spacing between particulates in particulate packs is relatively small, it can take relatively little scale deposition to significantly decrease the particulate pack's fluid permeability. Hence, descaling operations in the presence of a particulate pack can be highly desirable in order to sustain production from a wellbore.

Particulate packs often contain particulates that are consolidated with one another in order to retain the particulates in a set location within the wellbore. As used herein, the term "consolidated" refers to the adherence of a plurality of particulates to one another to form a coherent mass with retained permeability. In many instances, cured resins or like substances are used to achieve consolidation of particulates with one another.

Although a wide breadth of resins of varying structures and properties are known, a fair number of resins are unstable to varying degrees in the presence of acids. Such resins are referred to herein as "acid-unstable" resins. Both mineral and organic acids can lead to degradation of acid-unstable resins. Even the organic acid groups of many common chelating agents can instigate resin degradation under the extreme conditions present within a wellbore. Accordingly, it can be a very difficult task to remove inorganic scale in the presence of a resin-consolidated particulate pack, particularly when the inorganic scale is located within the particulate pack itself.

Although resin instability is undesirable in many instances, it can occasionally be useful to deconsolidate a particulate pack and remove it from a wellbore. For example, a remediation operation may need to be conducted without the particulate pack being held in place. Deconsolidation can be achieved through resin degradation, such as through treatment with an appropriate acid in the case of acid-unstable resins. Resin removal treatments in common use frequently utilize strong mineral acids that can present undesirable safety risks and environmental concerns.

BRIEF DESCRIPTION OF THE DRAWING

The following FIGURE is included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present disclosure to a downhole location, according to one or more embodiments.

DETAILED DESCRIPTION

The present disclosure generally relates to wellbore cleanout and other remediation operations, and, more specifically, to methods for removing inorganic scale in the presence of a consolidated particulate pack.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, wellbore cleanout and other remediation operations to remove inorganic scale and other dissolvable materials in the presence of a resin-consolidated particulate pack can often be problematic. Many resins are at least partially unstable in the presence of acids, and even the mildly acidic carboxylic acid groups present in some common chelating agents can often be sufficient to instigate deconsolidation through resin degradation. Even under the best circumstances, cleanout and other remediation operations in the presence of a resin-consolidated particulate pack may need to be performed with extreme care, which can add to the time, expense, and efficiency of producing a wellbore.

As mentioned above, even the modestly acidic carboxylic acid groups of common chelating agents may sometimes be sufficient to promote degradation of some acid-unstable resins or like substances. Aminopolycarboxylic acids represent a class of chelating agents that are sometimes capable of instigating resin degradation. Methylglycine diacetic acid (MDGA) represents an illustrative aminopolycarboxylic acid chelating agent that may instigate resin degradation, for example. Thus, even though aminopolycarboxylic acids possess excellent complexation properties, it may be difficult to use them in conjunction with some cleanout and other remediation operations.

N-(phosphonoalkyl)iminodiacetic acids represent another member of the general class of aminopolycarboxylic acid chelating agents. An illustrative N-(phosphonoalkyl)iminodiacetic acid is N-(phosphonomethyl)iminodiacetic acid (PMIDA). Due to a number of advantageous properties, several of which are discussed below, the present inventors studied the use of PMIDA and other N-(phosphonoalkyl) iminodiacetic acids and their salts in various wellbore processes.

More specifically, because of their desirable properties and the tendency for aminopolycarboxylic acids to promote degradation of acid-unstable resins, the present inventors investigated PMIDA and other N-(phosphonoalkyl)iminodiacetic acids and their salts for use as a resin removal system. The inventors surprisingly discovered, however, that PMIDA and other N-(phosphonoalkyl)iminodiacetic acids are largely unreactive toward acid-unstable resins under representative wellbore conditions. Although the inventors found PMIDA and other N-(phosphonoalkyl)iminodiacetic acids to be generally unsuitable as a resin removal system, the inventors found that the complexation properties of these substances remained largely unaffected. The inventors recognized that this fortuitous result could be leveraged for conducting cleanout and other remediation operations in the presence of acid-unstable resins and other acid-unstable materials, such as in consolidated particulate packs. By preserving a particulate pack in consolidated form during a treatment operation, the methods of the present disclosure may provide time and cost savings through avoiding a subsequent treatment operation to reconsolidate the particulate pack.

PMIDA effectively complexes a variety of metal ions with a range of stability constants. Table 1 below shows the stability constants at 20° C. of several alkaline earth metal ions complexed with PMIDA.

TABLE 1

| Metal Ion | $Log_{10}$ of Stability Constant |
|---|---|
| $Mg^{2+}$ | 6.28 |
| $Ca^{2+}$ | 7.18 |
| $Sr^{2+}$ | 5.59 |
| $Ba^{2+}$ | 5.35 |

These complexes are at least partially soluble in modestly acidic aqueous fluids, such as those having a pH of about 2 or above, and the solubility increases significantly above a pH of about 3.5. Hence, PMIDA can be an effective aminopolycarboxylic acid chelating agent for conducting a cleanout or other remediation operation, since soluble materials may be obtained.

Not only can PMIDA and other N-(phosphonoalkyl) iminodiacetic acids promote metal ion complexation in order to remove existing inorganic scale, but they may also discourage further scale deposition from occurring by functioning as a scale control additive. Without being bound by theory or mechanism, it is believed that the phosphonic acid groups of these compounds function to suppress new scale deposition once redissolution of existing scale has occurred. Thus, PMIDA and other N-(phosphonoalkyl)iminodiacetic acids combat scaling in a wellbore in complementary ways by addressing existing scale and discouraging the formation of new scale. Moreover, because they may desirably suppress the occurrence of further scaling, there is usually no pressing need to remove the residual descaling agent from the wellbore once a cleanout or other remediation operation has been completed. This can greatly simplify a cleanout operation by not having to perform overflushes to remove the residual descaling agent. In fact, a treatment fluid containing PMIDA or another N-(phosphonoalkyl)iminodiacetic acid may provide sufficient volume itself to promote a cleanout operation.

Not only can PMIDA and other N-(phosphonoalkyl) iminodiacetic acids promote dissolution of inorganic scale and suppress the deposition of new scale, but they can perform these functions without other mineral acids or organic acids being present, including those present in other chelating agents. By remaining functional for descaling in the absence of other mineral acids or organic acids, a treatment fluid comprising PMIDA or another N-(phosphonoalkyl)iminodiacetic acid can remain non-degrading toward acid-unstable resins and other acid-unstable substances. By omitting other acids during a subterranean treatment operation, the cost, safety and environmental profile of the treatment operation may desirably be improved.

Metal corrosion due to contact with an acid can represent a particularly troublesome issue at elevated wellbore temperatures. Corrosion of downhole metal surfaces and tools may be lessened by omitting other mineral acids and organic acids from a treatment fluid comprising PMIDA or another N-(phosphonoalkyl)iminodiacetic acid. Advantageously, PMIDA and other N-(phosphonoalkyl)iminodiacetic acids are largely non-corrosive to metal surfaces and tools. In addition, the inventors surprisingly found that PMIDA and other N-(phosphonoalkyl)iminodiacetic acids can actually suppress corrosion of metal surfaces by hydrofluoric acid. The corrosion protection afforded by PMIDA and other N-(phosphonoalkyl)iminodiacetic acids against hydrofluoric acid represents a further benefit of these compounds in subterranean treatment operations in which this acid is used.

In addition to promoting metal ion complexation and scale inhibition, PMIDA and other N-(phosphonoalkyl)iminodiacetic acids also possess several innate properties that make these compounds highly desirable for use in subterranean treatment operations. As mentioned above, these desirable properties initially spurred the inventors to study these compounds for various subterranean treatment operations. PMIDA is a relatively inexpensive material, thereby not adding an excessive cost burden to large scale operations. Moreover, PMIDA is believed to be environmentally benign, due at least in part to its propensity toward biodegradation. As used herein, the terms "biodegradation," "biodegradable" and related variants thereof will refer to a substance that can be broken down by exposure to environmental conditions including native or non-native microbes, sunlight, air, heat, and the like. No particular rate of biodegradation is implied by use of these terms unless otherwise specified herein. PMIDA advantageously possesses a sufficiently high chemical stability over the short term to promote wellbore cleanout and to suppress subsequent scale deposition, but a short enough biodegradation lifetime to make it environmentally friendly for use in most locales. Still further, PMIDA has good thermal stability, thereby allowing it to be used in high temperature subterranean formations, including those having a temperature above about 300° F. Even under these types of high temperature conditions, PMIDA and other N-(phosphonoalkyl)iminodiacetic acids can be used to affect metal ion complexation and to suppress further scale deposition without adversely affecting an acid-unstable resin in a resin-consolidated particulate pack. In contrast, some chelating agents (e.g., MGDA) and particularly mineral acids may exhibit profoundly increased reactivity toward acid-unstable resins at elevated wellbore temperatures, which can lead to rapid deconsolidation of a particulate pack.

A further advantage that PMIDA and other N-(phosphonoalkyl)iminodiacetic acids possess for over other descaling agents is that they may overcome near-wellbore plugging and damage that frequently accompanies conventional descaling treatments. PMIDA and other N-(phosphonoalkyl)iminodiacetic acids may overcome such issues by solubilizing metal ions comprising the inorganic scale, as discussed above. Conventional descaling treatments, in contrast, use large treatment fluid volumes or large overflushes in order to convey displaced scale, often in insoluble form, away from its original location in the wellbore before damage occurs. By using PMIDA and other N-(phosphonoalkyl)iminodiacetic acids to achieve descaling, smaller treatment fluid volumes and material quantities may be used relative to conventional descaling operations, again improving the cost and environmental profile of the descaling treatments disclosed herein.

In various embodiments, methods described herein may comprise: introducing a descaling agent comprising an N-(phosphonoalkyl)iminodiacetic acid or any salt thereof into a wellbore in fluid communication with a particulate pack, an inorganic scale being present in the wellbore or in the particulate pack; contacting the descaling agent with the particulate pack and the inorganic scale; and removing at least a portion of the inorganic scale using the N-(phosphonoalkyl)iminodiacetic acid or any salt thereof without substantially affecting the particulate pack.

In some embodiments, the inorganic scale may be present in the particulate pack. Accordingly, in such embodiments, the methods of the present disclosure may comprise removing at least a portion of the inorganic scale from the particulate pack. Removing at least a portion of the inorganic scale from the particulate pack may comprise contacting the N-(phosphonoalkyl)iminodiacetic acid or any salt thereof with the particulate pack, and dissolving at least a portion of the inorganic scale within the particulate pack. Dissolving at least a portion of the inorganic scale may restore permeability to the particulate pack and increase production. Inorganic scale located elsewhere than in the particulate pack may also be removed in conjunction with treatment of the particulate pack.

In some embodiments, the particulate pack may comprise a proppant pack or a gravel pack. Proppant particulates suitable for use in the various embodiments of the present disclosure are not believed to be particularly limited. Suitable proppant particulates include any material that can be satisfactorily consolidated under a particular set of conditions. Illustrative proppant particulates that may be used in conjunction with the embodiments described herein include, for example, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof. The mean particulate size of the proppant particulates generally may range from about 2 mesh to about 400 mesh on the U.S. Sieve Series, although other sizes or mixtures of sizes may be desirable in certain embodiments. The proppant particulates may be substantially spherical materials, fibrous materials, polygonal materials (such as cubic materials), irregular shapes, and any combination thereof. Gravel particulates are similarly not believed to be particularly limited in size, shape or composition.

In further embodiments, the particulate pack may comprise a consolidated particulate pack. A consolidated particulate pack may comprise a plurality of particulates (e.g., proppant particulates or gravel particulates) and a cured resin or like material. Such particulate packs will be referred to herein as being "resin-consolidated." As used herein, the term "resin" will refer to any of numerous physically similar polymerized synthetics or chemically modified natural resins, including thermoplastic materials and thermosetting materials, illustrative members of which are described below. As used herein, the term "cured resin" will refer to a solidified polymeric mass. In some embodiments, a cured resin may be formed from a single-component uncured resin through self-polymerization. In other embodiments, a cured resin may be formed through combining two or more resin components together and curing through polymerization (i.e., a multi-component resin). Although some embodiments herein may refer to resins and resin-consolidated particulate packs, it is to be recognized that other consolidating materials with similar properties to resins may also be used in the alternative.

In some embodiments, the consolidated particulate pack may comprise an acid-unstable resin. The acid-unstable resin may be substantially unaffected by or unreacted with the N-(phosphonoalkyl)iminodiacetic acid or any salt thereof. As used herein, an acid-unstable resin will be considered to be "substantially unaffected by" or "substantially unreacted with" an acid, if the resin is not significantly degraded by the acid over the timeframe of conducting a subterranean treatment operation. That is, an acid-unstable resin or like substance does not become appreciably solubilized over time upon contacting the N-(phosphonoalkyl)iminodiacetic acid or any salt thereof. Any resin or like substance that is capable of undergoing hydrolysis under specific wellbore conditions may be considered to be at least partially acid-unstable. Extended contact times with conventional mineral acids and organic acids under the extreme conditions present in a wellbore can be particularly problematic when an acid-unstable resin is present.

One type of resin suitable for use in the embodiments of the present disclosure comprises a two-component epoxy-based resin comprising a liquid hardenable resin component and a liquid hardening agent component. The liquid hardenable resin component comprises a hardenable resin and an optional solvent. The solvent may be added to the resin to reduce its viscosity for ease of handling, mixing and transferring. It is within the ability of one having ordinary skill in the art, with the benefit of this disclosure, to determine if and how much solvent may be needed to achieve a suitable viscosity for given subterranean conditions. Factors that may affect this decision include geographic location of the well, the surrounding weather conditions, and the desired long-term stability of the consolidating agent. An alternate way to reduce the viscosity of the hardenable resin is to heat it. The second component is the liquid hardening agent component, which comprises a hardening agent, an optional silane coupling agent, a surfactant, an optional hydrolyzable ester, and an optional liquid carrier fluid for, among other things, reducing the viscosity of the hardening agent component.

Examples of hardenable resins may include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and combinations thereof. In some embodiments, the hardenable resin may comprise a urethane resin.

The hardenable resin may be included in the liquid hardenable resin component in an amount between about 5% to about 100% by weight of the liquid hardenable resin component. It is within the ability of one having ordinary skill in the art, with the benefit of this disclosure, to determine how much of the liquid hardenable resin component may be needed to achieve the desired results. Factors that may affect this decision include the types of liquid hardenable resin component and liquid hardening agent component used.

Any solvent that is compatible with the hardenable resin and achieves the desired viscosity effect may be suitable for use in the liquid hardenable resin component. Suitable solvents may include, for example, butyl lactate, dipropylene glycol methyl ether, dipropylene glycol dimethyl ether, dimethyl formamide, diethylene glycol methyl ether, ethylene glycol butyl ether, diethylene glycol butyl ether, propylene carbonate, methanol, isopropanol butyl alcohol, D-limonene, 2-butoxy ethanol, ethers of C2-C6 dihydric alkanols containing at least one C2-C6 alkyl group, monoethers or dihydric alkanols, fatty acid methyl esters, butylglycidyl ether, methoxypropanol, butoxyethanol, and hexoxyethanol and any combination thereof. Selection of an appropriate solvent and amount thereof may be made by one having ordinary skill in the art, with the benefit of this disclosure.

As described above, use of a solvent in the liquid hardenable resin component is optional but may be desirable to reduce the viscosity for ease of handling, mixing, and transferring. However, it may be desirable in some embodiments to not use a solvent for environmental or safety reasons. In some embodiments, an amount of the solvent used in the liquid hardenable resin component may range between about 0.1% to about 30% by weight of the liquid hardenable resin component. Optionally, the liquid hardenable resin component may be heated to reduce its viscosity, in place of, or in addition to, using a solvent.

Examples of hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and any combination thereof. The chosen hardening agent may affect the range of temperatures over which a hardenable resin is able to cure.

The hardening agent may be included in the liquid hardening agent component in an amount sufficient to at least partially harden the resin composition. In some embodiments, the hardening agent may be included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the consolidating agent may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present in the water. In other embodiments, the liquid hardenable resin component may be emulsified in water and the liquid hardening agent component may be provided separately. Similarly, in other embodiments, both the liquid hardenable resin component and the liquid hardening agent component may both be emulsified in water.

An optional silane coupling agent may be used for, among other things, to act as a mediator to help bond the resin to formation particulates or proppant particulates. Examples of suitable silane coupling agents include, but are not limited to, N-2-(aminoethyl)-3-aminopropyltrimethoxysilane, 3-glycidoxypropyltrimethoxysilane, and combinations thereof. The silane coupling agent may be included in the resin component or the liquid hardening agent component. In some embodiments, the silane coupling agent may be included in the liquid hardening agent component in a range between about 0.1% to about 3% by weight of the liquid hardening agent component.

Any surfactant compatible with the hardening agent and capable of facilitating the coating of the resin onto particulates in the subterranean formation may be used in the liquid hardening agent component. Suitable surfactants include, but are not limited to, an alkyl phosphonate surfactant (e.g., a C12-C22 alkyl phosphonate surfactant), an ethoxylated nonyl phenol phosphate ester, one or more cationic surfactants, one or more nonionic surfactants, or any combination thereof. The surfactant(s) may be included in the liquid hardening agent component in an amount ranging between about 1% to about 10% by weight of the liquid hardening agent component.

Examples of hydrolyzable esters that may be included in the liquid hardening agent component include, but are not limited to, a combination of dimethylglutarate, dimethyladipate, and dimethylsuccinate; dimethylthiolate; methyl salicylate; dimethyl salicylate; and dimethylsuccinate. When used, a hydrolyzable ester may be included in the liquid hardening agent component in an amount ranging between about 0.1% to about 3% by weight of the liquid hardening agent component. In some embodiments, a hydrolyzable ester may be included in the liquid hardening agent component in an amount ranging between about 1% to about 2.5% by weight of the liquid hardening agent component.

Other resins suitable for use in the embodiments of the present disclosure are furan-based resins. Suitable furan-based resins include, but are not limited to, furfuryl alcohol resins, furfural resins, combinations of furfuryl alcohol resins and aldehydes, and a combination of furan resins and phenolic resins. Furan-based resins may be combined with a solvent to control viscosity if desired. Suitable solvents for use in the furan-based resins and other resins disclosed herein include, but are not limited to, 2-butoxyethanol, butyl lactate, butyl acetate, tetrahydrofurfuryl methacrylate, tetrahydrofurfuryl acrylate, esters of oxalic, maleic and succinic acids, and furfuryl acetate.

Optionally, the furan-based resins may further comprise a curing agent to facilitate or accelerate curing of the furan-based resin at lower temperatures. Examples of suitable curing agents include, but are not limited to, organic or inorganic acids, such as, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. When a curing agent is not used, the furan-based resin may cure autocatalytically.

Still other resins suitable for use in the embodiments of the present disclosure are phenolic-based resins. Suitable phenolic-based resins include, but are not limited to, terpolymers of phenol, phenolic formaldehyde resins, and a combination of phenolic and furan resins. In some embodiments, a combination of phenolic and furan resins may be used. In some embodiments, a phenolic-based resin may be combined with a solvent to control viscosity, if desired. Suitable solvents are described above.

Yet another suitable resin type includes a phenol/phenol formaldehyde/furfuryl alcohol resin comprising about 5% to about 30% phenol, of about 40% to about 70% phenol formaldehyde, about 10% to about 40% furfuryl alcohol, about 0.1% to about 3% of a silane coupling agent, and about 1% to about 15% of a surfactant.

In some embodiments, filler particles may optionally be present in the resin. Suitable filler particles may include any particle that does not adversely react with the other components or with the subterranean formation. Examples of suitable filler particles include, for example, silica, glass, clay, alumina, fumed silica, carbon black, graphite, mica, meta-silicate, calcium silicate, calcine, kaoline, talc, zirconia, titanium dioxide, fly ash, and boron, and any combination thereof. In some embodiments, the filler particles may range in size of about 0.01 μm to about 100 μm. In some embodiments, the filler particles may be included in the resin composition in an amount ranging between about 0.1% to about 70% by weight of the resin composition, or between about 0.5% to about 40% by weight of the resin composition, or between about 1% to about 10% by weight of the resin composition.

In various embodiments, the descaling agents described herein may be introduced into a wellbore penetrating a subterranean formation in a treatment fluid. Such treatment fluids may comprise a carrier fluid and the N-(phosphonoalkyl)iminodiacetic acid or any salt thereof. In various embodiments, a concentration of the N-(phosphonoalkyl) iminodiacetic acid or any salt thereof in the treatment fluid may range between about 1.5 wt. % and about 45 wt. %. In more specific embodiments, the concentration of the N-(phosphonoalkyl)iminodiacetic acid or any salt thereof in the treatment fluid may range between about 1.5 wt. % and about 15 wt. %.

The treatment fluids of the present disclosure may comprise an aqueous fluid or an oleaginous carrier fluid as their continuous phase. Suitable aqueous carrier fluids may include, for example, fresh water, salt water, seawater, produced water, brackish water, brine (e.g., a saturated salt solution), flowback water, or an aqueous salt solution (e.g., a non-saturated salt solution). Aqueous carrier fluids may be obtained from any suitable source.

In some embodiments, an organic co-solvent may be included with an aqueous carrier fluid. Suitable organic co-solvents may include, but are not limited to, glycols and alcohol solvents, for example. Other organic co-solvents may also be suitable. When present, the amount of the organic co-solvent may range between about 1% to about 50% by volume of the treatment fluid.

In other various embodiments, the carrier fluid of the treatment fluids may comprise an oleaginous carrier fluid. Suitable oleaginous carrier fluids may include, for example, an organic solvent, a hydrocarbon, oil, a refined component of oil, or any combination thereof.

In some embodiments, an organic acid or a mineral acid may be present in a treatment fluid in combination with the N-(phosphonoalkyl)iminodiacetic acid or any salt thereof. The additional acid may be used to adjust the treatment fluid's pH relative to that natively provided by the acidic groups of the N-(phosphonoalkyl)iminodiacetic acid or any salt thereof. Illustrative organic acids or mineral acids that may optionally be present include, for example, hydrochloric acid, formic acid, and acetic acid. Acid-generating compounds may similarly be present.

As discussed above, the treatment fluids of the current disclosure are more desirably lacking in other acids or chelating agents present in combination with the N-(phosphonoalkyl)iminodiacetic acid or any salt thereof. Additional chelating agents containing carboxylic acid groups may be particularly desirable to omit from a treatment fluid comprising an N-(phosphonoalkyl)iminodiacetic acid or any salt thereof. When other mineral acids or organic acids, including those present in chelating agents, are lacking from a treatment fluid comprising the N-(phosphonoalkyl)iminodiacetic acid or any salt thereof, the treatment fluid's pH may rest largely upon the protonation state of the N-(phosphonoalkyl)iminodiacetic acid and its concentration in the treatment fluid. The four pKa values for N-(phosphonoalkyl)iminodiacetic acid are approximately 2.00, 2.25, 5.57 and 10.76. A fully protonated N-(phosphonoalkyl)iminodiacetic acid alone may produce a buffered aqueous pH in the range of about 0.5 to 1.8, particularly a pH in the range of about 1.6 to about 1.8. Bases such as metal hydroxides, carbonates and bicarbonates may be added to raise the aqueous pH and at least partially deprotonate the N-(phosphonoalkyl)iminodiacetic acid. When the pH is upwardly adjusted with a base, the pH may be adjusted to any suitable value, such as a pH of about 13 or below, particularly a pH range of about 3 to about 6, or a pH range of about 6 to about 9, or a pH range of about 8 to about 10, or a pH range of about 10 to about 13. For example, when contacting gypsum scale, a pH of about 8.5 may be desirable. A lower pH range may be more desirable when contacting carbonate scale.

In view of the desirability to forego the presence of other acids in a treatment fluid comprising N-(phosphonoalkyl) iminodiacetic acid or any salt thereof, the treatment fluids of the present disclosure may contain no other organic or mineral acids in combination with the N-(phosphonoalkyl) iminodiacetic acid or any salt thereof.

Similarly, in some embodiments, the treatment fluids of the present disclosure may contain no other chelating agents in combination with the N-(phosphonoalkyl)iminodiacetic acid or any salt thereof. In particular, it may be desirable to exclude other chelating agents comprising carboxylic acid groups, such as other aminopolycarboxylic acids.

Accordingly, in still further embodiments, the treatment fluids of the present disclosure may consist essentially of a carrier fluid and an N-(phosphonoalkyl)iminodiacetic acid or any salt thereof. Carrier fluids may include an aqueous fluid and one or more optional mutual solvents. In further embodiments, the treatment fluids of the present disclosure may consist essentially of a carrier fluid, an N-(phosphonoalkyl)iminodiacetic acid or any salt thereof, and one or more of a surfactant and/or a corrosion inhibitor. Suitable surfactants and corrosion inhibitors will be familiar to one having ordinary skill in the art and may be chosen in response to the particular conditions to which the treatment fluid will be exposed.

In other various embodiments, treatment fluids of the present disclosure may comprise a carrier fluid and an N-(phosphonoalkyl)iminodiacetic acid or any salt thereof. In further embodiments, such treatment fluids may also comprise any number of additives that are commonly used in downhole operations including, for example, silica scale control additives, corrosion inhibitors, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. One having ordinary skill in the art and the benefit of this disclosure will be able to formulate a treatment fluid having properties suitable for a given application.

In various embodiments, the neutral form of the N-(phosphonoalkyl)iminodiacetic acid comprising the descaling agent of the present disclosure may have the structure shown in Formula 1

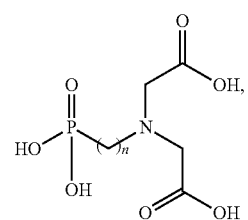

Formula 1 wherein n is an integer ranging between 1 and about 5. A carbon chain length of this range may be beneficial in promoting aqueous solubility of the N-(phosphonoalkyl) iminodiacetic acid or a metal complex thereof. In more specific embodiments, a particularly suitable N-(phosphonoalkyl)iminodiacetic acid for practicing the disclosure herein can be N-(phosphonomethyl)iminodiacetic acid, in which n is 1. Additional functionality may also be introduced to the N-(phosphonoalkyl)iminodiacetic acid in order to further tailor its solubility, pKa values, and/or biodegradation rate, for example.

In various embodiments, removing at least a portion of the inorganic scale using the N-(phosphonoalkyl)iminodiacetic acid or any salt thereof may comprise complexing a metal ion from a metal salt comprising the inorganic scale. A variety of inorganic scales may be contacted with the descaling agent and undergo removal according to the embodiments of the present disclosure, such as carbonate scales or sulfate scales, for example. Particular inorganic scales that may undergo removal according to the embodiments of the present disclosure include, for example, calcium-containing scales, magnesium-containing scales, iron-containing scales, barium-containing scales, strontium-containing scales, and any combination thereof. More specific examples of inorganic scales that may be removed according to the embodiments of the present disclosure include, for example, gypsum scale, calcite scale, barium sulfate scale, or any combination thereof.

In some embodiments, a siliceous scale also containing a metal salt may be addressed by practicing the disclosure provided herein. Contacting an N-(phosphonoalkyl)iminodiacetic acid or any salt thereof with such a siliceous scale may remove at least a portion of the metallic components of the siliceous scale without resorting to hydrofluoric acid-based descaling techniques for addressing the siliceous components of the scale. This action may at least partially restore permeability within the area impacted by the siliceous scale without utilizing another acid. Optionally, treatment of the siliceous scale with hydrofluoric acid may follow removal of the metallic components, and the interaction of the hydrofluoric acid with the siliceous scale may be enhanced through doing so. Removing the metallic components of a siliceous scale may also loosen the scale from its deposition location, thereby allowing the remaining scale to be removed by techniques other than utilizing another acid (e.g., mechanical scrapping and the like).

Accordingly, in some embodiments, methods of the present disclosure may comprise: contacting a particulate pack with a treatment fluid comprising a descaling agent, the descaling agent comprising an N-(phosphonoalkyl)iminodiacetic acid or any salt thereof, and the particulate pack being resin consolidated; and removing at least a portion of an acid-soluble material from the particulate pack using the N-(phosphonoalkyl)iminodiacetic acid or any salt thereof without substantially deconsolidating the particulate pack.

In other various embodiments, systems configured for delivering a treatment fluid of the present disclosure to a downhole location are described herein. In various embodiments, the systems can comprise a pump fluidly coupled to a tubular, the tubular containing a treatment fluid comprising a descaling agent comprising an N-(phosphonoalkyl)iminodiacetic acid or any salt thereof, a concentration of the N-(phosphonoalkyl)iminodiacetic acid or any salt thereof in the treatment fluid ranging between about 1.5 wt. % and about 45 wt. % and no other organic or mineral acids being present in the treatment fluid in combination with the N-(phosphonoalkyl)iminodiacetic acid or any salt thereof. In further embodiments, the systems may comprise a treatment fluid that consists essentially of a carrier fluid and an N-(phosphonoalkyl)iminodiacetic acid or any salt thereof.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the N-(phosphonoalkyl)iminodiacetic acid or any salt thereof is formulated with a carrier fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for conducting a cleanout operation in a wellbore containing a particulate pack. The methods comprise: introducing a descaling agent comprising an N-(phosphonoalkyl)iminodiacetic acid or any salt thereof into a wellbore in fluid communication with a particulate pack, an inorganic scale being present in the wellbore or in the particulate pack; contacting the descaling agent with the particulate pack and the inorganic scale; and removing at least a portion of the inorganic scale using the N-(phosphonoalkyl)iminodiacetic acid or any salt thereof without substantially affecting the particulate pack.

B. Methods for conducting a cleanout operation in the presence of a particulate pack. The methods comprise: contacting a particulate pack with a treatment fluid comprising a descaling agent, the descaling agent comprising an N-(phosphonoalkyl)iminodiacetic acid or any salt thereof, and the particulate pack being resin-consolidated; and removing at least a portion of an acid-soluble material from the particulate pack using the N-(phosphonoalkyl)iminodiacetic acid or any salt thereof without substantially deconsolidating the particulate pack.

C. Systems for conducting a wellbore cleanout operation. The systems comprise: a pump fluidly coupled to a tubular, the tubular containing a treatment fluid comprising a descaling agent comprising an N-(phosphonoalkyl)iminodiacetic acid or any salt thereof, a concentration of the N-(phosphonalkyl)iminodiacetic acid or any salt thereof in the treatment fluid ranging between about 1.5 wt. % and about 45 wt. % and no other organic or mineral acids being present in the treatment fluid in combination with the N-(phosphonoalkyl)iminodiacetic acid or any salt thereof.

Each of embodiments A-C may have one or more of the following additional elements in any combination:

Element 1: wherein the inorganic scale is present in the particulate pack.

Element 2: wherein removing at least a portion of the inorganic scale using the N-(phosphonoalkyl)iminodiacetic acid or any salt thereof comprises complexing a metal ion from a metal salt comprising the inorganic scale.

Element 3: wherein the inorganic scale comprises a calcium-containing scale, a magnesium-containing scale, an iron-containing scale, a barium-containing scale, a strontium-containing scale or any combination thereof.

Element 4: wherein the particulate pack comprises a consolidated particulate pack.

Element 5: wherein the consolidated particulate pack comprises an acid-unstable resin, the acid-unstable resin being substantially unreacted with the N-(phosphonalkyl)iminodiacetic acid or any salt thereof.

Element 6: wherein the N-(phosphonoalkyl)iminodiacetic acid has a structure of

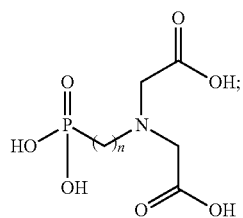

wherein n is an integer ranging between 1 and about 5.

Element 7: wherein the N-(phosphonoalkyl)iminodiacetic acid comprises N-(phosphonomethyl)iminodiacetic acid.

Element 8: wherein the particulate pack comprises a proppant pack or a gravel pack.

Element 9: wherein the descaling agent is introduced into the wellbore in a treatment fluid, a concentration of the N-(phosphonoalkyl)iminodiacetic acid or any salt thereof in the treatment fluid ranging between about 1.5 wt. % and about 45 wt. %.

Element 10: wherein no other organic or mineral acids are present in the treatment fluid in combination with the N-(phosphonoalkyl)iminodiacetic acid or any salt thereof.

Element 11: wherein no other chelating agents are present in the treatment fluid in combination with the N-(phosphonoalkyl)iminodiacetic acid or any salt thereof.

Element 12: wherein the acid-soluble material comprises an inorganic scale present in the particulate pack.

Element 13: wherein removing the acid-soluble material from the particulate pack using the N-(phosphonoalkyl)iminodiacetic acid or any salt thereof comprises complexing a metal ion from a metal salt comprising the inorganic scale.

Element 14: wherein the particulate pack comprises an acid-unstable resin, the acid-unstable resin being substantially unreacted with the N-(phosphonalkyl)iminodiacetic acid or any salt thereof.

Element 15: wherein a concentration of the N-(phosphonoalkyl)iminodiacetic acid or any salt thereof in the treatment fluid ranges between about 1.5 wt. % and about 45 wt. %.

Element 16: wherein the treatment fluid consists essentially of a carrier fluid and the N-(phosphonoalkyl)iminodiacetic acid or any salt thereof.

By way of non-limiting example, exemplary combinations applicable to A-C include:

The method of A in combination with elements 1 and 3.
The method of A in combination with elements 1 and 4.
The method of A in combination with elements 4, 5 and 6.
The method of A in combination with elements 1, 4 and 9.
The method of A in combination with elements 4, 5 and 10.
The method of A in combination with elements 4, 5 and 11.
The method of A in combination with elements 12 and 14.
The method of B in combination with elements 6 and 12.
The method of B in combination with elements 2 and 12.
The method of B in combination with elements 2 and 5.
The method of B in combination with elements 3, 5 and 10.
The system of C in combination with elements 10, 11 and 16.

To facilitate a better understanding of the embodiments of the present disclosure, the following examples of preferred or representative embodiments are given. In no way should the following examples be read to limit, or to define, the scope of the disclosure.

EXAMPLES

Example 1: Resin Stability in the Presence of PMIDA

Unconsolidated 20/40 sand was treated with EXPEDITE 225 resin system (Halliburton Energy Services) and fully cured at 100° F. over a period of time. Sample disks were then cut from the consolidated sand held together with cured resin. The sample disks were then exposed to the following test fluids for 48 hours at 200° F. under 500 psi of applied pressure: Sample 1 (100 mL of water, control), Sample 2 (100 mL of water and 5 g of PMIDA), and Sample 3 (100 mL of water and 10 g of PMIDA). In each instance, the sample disks remained intact with no softening. By way of comparison, the resin was degraded under similar conditions in the presence of MGDA.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
introducing a treatment fluid comprising a descaling agent and a carrier fluid into a wellbore, the descaling agent comprising an N-(phosphonoalkyl)iminodiacetic acid with the following structure:

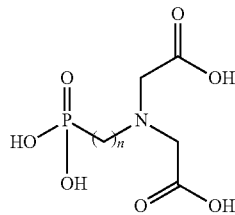

or any salt thereof, wherein n is an integer ranging between 1 to 5, and wherein the treatment fluid has a pH less than 13;
contacting a resin-consolidated particulate pack with the treatment fluid, wherein the particulate pack is in fluid communication with the wellbore, and wherein the resin-consolidated particulate pack comprises an acid-soluble material and an acid-unstable resin;
removing at least a portion of the acid-soluble material from the particulate pack using the N-(phosphonoalkyl) iminodiacetic acid or any salt thereof without deconsolidating the particulate pack; and
not degrading the acid-unstable resin with the N-(phosphonoalkyl)iminodiacetic acid or any salt thereof.

2. The method of claim 1 wherein the descaling agent comprises N-(phosphonomethyl)iminodiacetic acid.

3. The method of claim 1 wherein the descaling agent is present in an amount of 1.5 wt. % to 45 wt. %.

4. The method of claim 1 wherein the descaling agent is present in an amount of 1.5 wt. % to 15 wt. %.

5. The method of claim 1 wherein the carrier fluid comprises an aqueous fluid or oleaginous fluid.

6. The method of claim 5 wherein the carrier fluid is an aqueous fluid and wherein the carrier fluid further comprises an organic co-solvent.

7. The method of claim 1 wherein one or more organic or mineral acids are present in the treatment fluid in combination with the N-(phosphonoalkyl)iminodiacetic acid or any salt thereof.

8. The method of claim 1 wherein the particulate pack comprises a proppant pack or a gravel pack.

9. The method of claim 1 wherein the treatment fluid has a pH of 3 to 13.

10. The method of claim 1 wherein the treatment fluid has a pH in a range of 3 to 10.

11. The method of claim 1 wherein the wellbore comprises a dissolvable material that forms an inorganic scale, wherein the inorganic scale is deposited in the wellbore, and wherein the N(phosphonoalkyl)iminodiacetic acid removes the inorganic scale from the wellbore.

12. The method of claim 11 wherein the inorganic scale is at least one of calcium-containing scale, a magnesium-containing scale, an iron-containing scale, a barium-containing scale, a strontium-containing scale or any combination thereof.

13. The method of claim 1, wherein the treatment fluid in combination with the N-(phosphonoalkyl)iminodiacetic acid or any salt thereof is free of any other organic or mineral acid.

14. The method of claim 1, wherein the acid-soluble material comprises an inorganic scale present in the particulate pack.

15. A method comprising:
preparing a treatment fluid comprising:
a carrier fluid;
a descaling agent comprising an N-(phosphonoalkyl) iminodiacetic acid with the following structure:

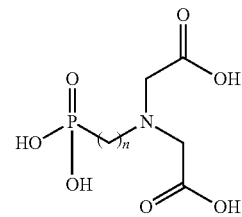

or any salt thereof,
wherein n is an integer ranging between 1 to 5 and wherein the treatment fluid has a pH less than 13;

introducing the treatment fluid into a wellbore, contacting a resin-consolidated particulate pack with the treatment fluid, wherein the particulate pack is in fluid communication with the wellbore, and wherein the resin-consolidated particulate pack comprises an acid-soluble material and an acid-unstable resin;

removing at least a portion of the acid-soluble material from the particulate pack using the N-(phosphonoalkyl)iminodiacetic acid or any salt thereof without deconsolidating the particulate pack; and not degrading the acid-unstable resin with the N-(phosphonoalkyl)iminodiacetic acid or any salt thereof.

16. The method of claim 15 wherein the descaling agent comprising N-(phosphonoalkyl)iminodiacetic acid or any salt thereof is present in an amount of 1.5 wt. % to 45 wt. %.

17. The method of claim 15 wherein the treatment fluid has a pH of 10 to 13.

18. The method of claim 15 wherein the treatment fluid has a pH of 3 to 10.

19. The method of claim 15 wherein the wellbore comprises a dissolvable material that forms an inorganic scale, wherein the inorganic scale is deposited in the wellbore, and wherein the N-(phosphonoalkyl)iminodiacetic acid removes the inorganic scale from the wellbore.

20. The method of claim 19 wherein the inorganic scale is at least one of calcium-containing scale, a magnesium-containing scale, an iron-containing scale, a barium-containing scale, a strontium-containing scale or any combination thereof.

* * * * *